July 5, 1949.  L. W. GOTTSCHALCK  2,474,894
SEAMLESS HOSIERY AND METHOD OF MAKING THE SAME
Filed March 11, 1947  4 Sheets-Sheet 1

INVENTOR
LAWRENCE W. GOTTSCHALCK
BY Robert Irving Williams
ATTORNEY

July 5, 1949.  L. W. GOTTSCHALCK  2,474,894
SEAMLESS HOSIERY AND METHOD OF MAKING THE SAME
Filed March 11, 1947  4 Sheets-Sheet 2
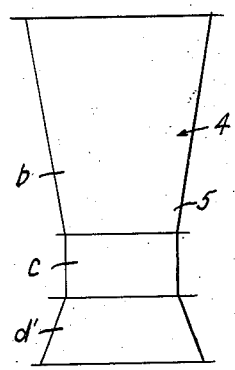
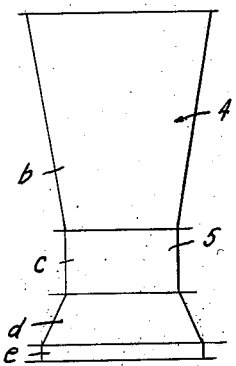
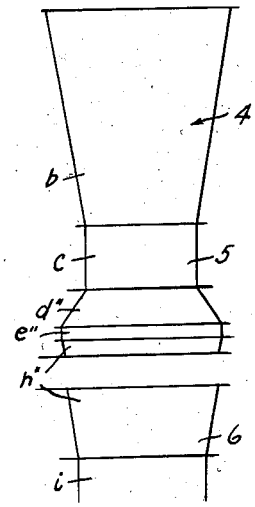
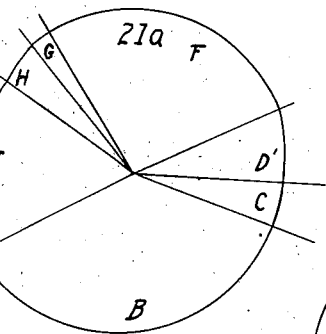
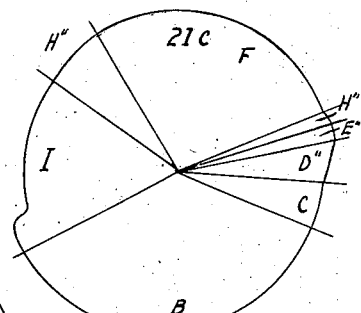
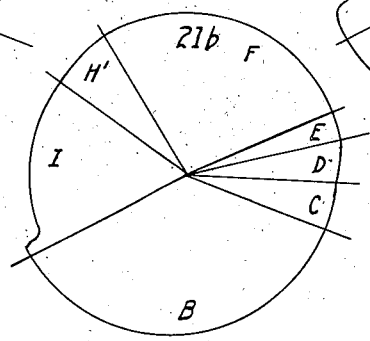
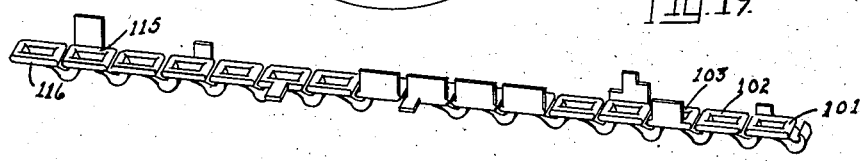
INVENTOR
LAWRENCE W. GOTTSCHALCK
BY Robert Irving Williams
ATTORNEY July 5, 1949.    L. W. GOTTSCHALCK    2,474,894
SEAMLESS HOSIERY AND METHOD OF MAKING THE SAME
Filed March 11, 1947    4 Sheets-Sheet 3
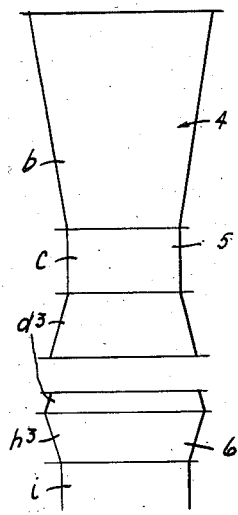
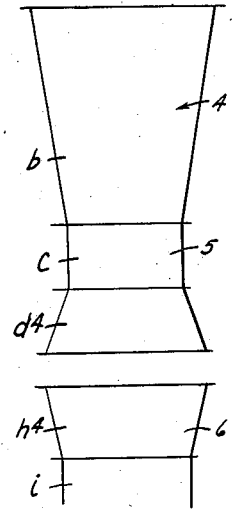
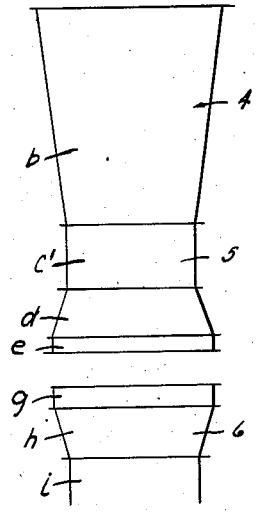
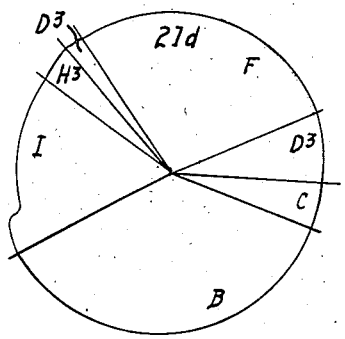
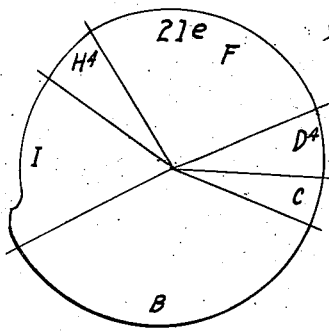
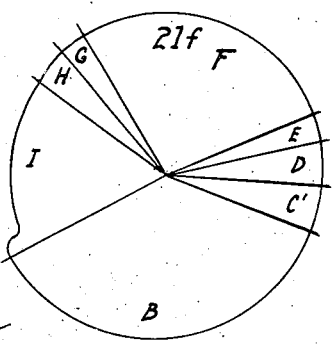
INVENTOR
LAWRENCE W. GOTTSCHALCK
BY
Robert Irving Williams
ATTORNEY July 5, 1949. L. W. GOTTSCHALCK 2,474,894
SEAMLESS HOSIERY AND METHOD OF MAKING THE SAME
Filed March 11, 1947 4 Sheets-Sheet 4

INVENTOR
LAWRENCE W. GOTTSCHALCK
BY
Robert Irving Williams
ATTORNEY

Patented July 5, 1949

2,474,894

UNITED STATES PATENT OFFICE 2,474,894

SEAMLESS HOSIERY AND METHOD OF MAKING THE SAME

Lawrence W. Gottschalck, New York, N. Y.

Application March 11, 1947, Serial No. 733,741,

15 Claims. (Cl. 66—183)

This invention relates to hosiery and more particularly to seamless hosiery, and to methods and machines for making the same.

In the knitting of seamless hosiery it has been customary for years to regulate the width of a stocking by knitting long loops in the upper portion of the stocking and short loops in the ankle, heel-diagonal, and arch portions and by knitting rows of gradually-decreasing-length loops thruout the calf portion. This solved the major problem in making seamless stockings a practicality, and the seamless stockings on the market today are still made with uniformly long loops in the upper portion (of the "leg" or "body" of the stocking) and uniformly short loops in their angle, heel-diagonal, and arch portions. This has resulted in a difficulty which has grown more and more annoying to wearers as sheer stockings have been used more and more thru the years and has persisted as the wide use of silk and nylon yarns has made stockings more and more things of beauty rather than merely of utility. This difficulty is the tendency of the stocking to wrinkle at the portion at the front of the heel which is variously known as the "ankle-joint portion" and the "heel-diagonal portion," if the lower portion of the stocking is knit tight enough to hug the ankle, or to fit slackly at the ankle if knit loose enough to fit perfectly over the heel-diagonal portion as it extends diagonally at either side of the heel pocket line. This has been one of the main reasons for the swing of the public from seamless to full fashioned hosiery.

The heel-diagonal fit of a stocking has always been a critical problem, since the foot is more or less at right angles to the leg and there is a natural tendency for the fabric to gather and wrinkle at the turn. The ankle of the average woman has considerably less circumference than the circumference at her heel diagonally across the ankle-joint. In full fashioned knitting, needles may be added or taken away in the needle bar automatically to shape the fabric blank to conform with the requirements of the stocking to fit properly. However, in seamless stockings the rows of knitting have been composed of uniform loops thruout the ankle, heel-diagonal, and arch portions, said loops being customarily tighter than the upper portions of the "body" or "leg" of the hose. Consequently, with the exception of the heel pocket area, there is no variation, as knit, in the width or circumference of body of the stocking from the start of the ankle to the toe and, in particular, either the loops in the ankle are made too long for good fit if the heel-diagonal portion is to fit perfectly without wrinkling or those in the heel-diagonal portion are too short for good fit if the ankle fits well. In general commercial practice, it is preferable to knit a stocking with a firm stitch thruout as a matter of quality manufacturing, as a sleazy stitch will give the stockings an inferior appearance and unsatisfactory resistance to wear. Therefore, in making a quality seamless stocking the already-firm stitch in the upper leg must be made still tighter in the ankle, heel-diagonal portion, and foot, as a result of stitch-graduating in order to give the stocking a shape conforming with the leg. There has been a limit to the snugness of the fit at the ankle because the body stitches are under strain during the knitting of the heel pocket and what may be an ideal tightness for fit at the ankle may cause "cutting" at the heel-diagonal during the heel-pocket knitting, resulting in the ruin of the stocking. Such heel-diagonal "cutting" is sometimes aggravated by the body yarn running heavier at this point due to yarn unevenness in manufacture, uneven application of size during the yarn-throwing process, increased drag on the yarn due to uneven cone winding, drop of machine temperature during shut-down periods, etc. all of which bring about tighter knitting than intended. For these and other reasons, a tight stitch is desirable in the ankle and, in variable degrees, in the foot, but is definitely undesirable in the heel-diagonal portion. A tight stitch is a closed loop of yarn, and where the entire fabric is tightly knit the closed loops are crowded together into a compact material which loses to an undesirable degree the elastic non-wrinkling qualities of a knitted structure, and approaches the rigidity of a woven one. Compactness of the fabric and lack of an adequately open stitch retards the ability of the stitch to adjust itself to the constantly changing requirement in fabric flexibility that is needed to insure the constantly smooth fit of the fabric at the heel-diagonal portion when the foot is in motion, with resultant buckling and the throwing of one or more wrinkles across the heel-diagonal portion. In extreme cases, a person with bulkier-than-average heel-diagonal portion will stretch the heel-diagonal portion fabric greater than the fabric stitch can allow, and the stitches will fold over each other in wrinkles even when the foot is not in motion. Full fashioned fabric does not suffer from these wrinkling difficulties because such stockings have a uniformly open and therefore flexible stitch thruout the body of the hose.

With the foregoing and other considerations in view the present invention contemplates the provision of hosiery knitted with longer loops in the heel-diagonal portion than in the ankle portion and the arch portion. In other words, there is more yarn knitted in the individual loop in the courses of the heel-diagonal portion than in the ankle portion or the arch portion. In certain of the more specific aspects of the invention the loops in the ankle portion are made shorter than in either the heel-diagonal or arch portions; the change from one length to another thruout the ankle, heel-diagonal and arch portions is gradual; and/or the heel-diagonal portion is formed with a series of rows of loops of uniform length at or near the heel-pocket line.

The invention accordingly comprises the several steps and the relation and order of one or more of such steps with respect to each of the others, the apparatus embodying features of construction, combinations of elements, and arrangement of parts, adapted to effect such steps, and the article which possesses the characteristics, properties, and relation of elements, all as exemplified in the detailed disclosure hereinafter set forth, the scope of the application thereof being indicated in the claims.

For a fuller understanding of the nature and objects of the invention, reference should be had to the following detailed description taken in connection with the accompanying drawings, in which:

Fig. 3 is a view similar to Fig. 2 showing a modified form of stocking embodying the invention;

Figure 2:
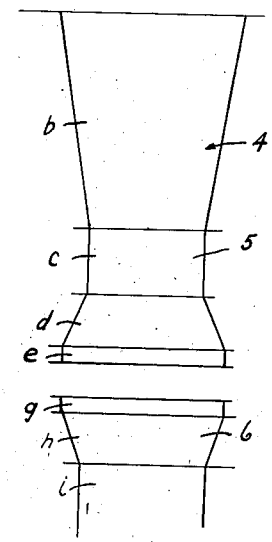
Fig. 2 is a schematic front flattened out view of the same stocking divided at the heel line, and with the toe and heel portions omitted.
Figure 17:
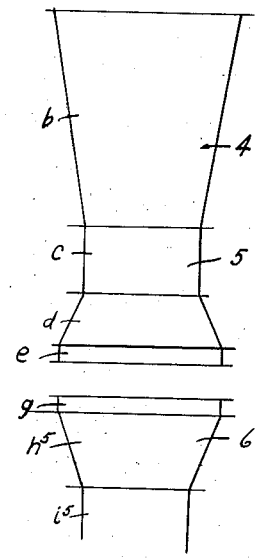
Figure 10:
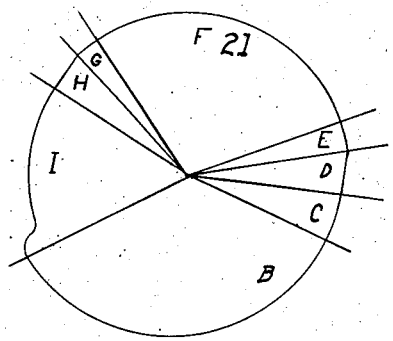
Figure 18:
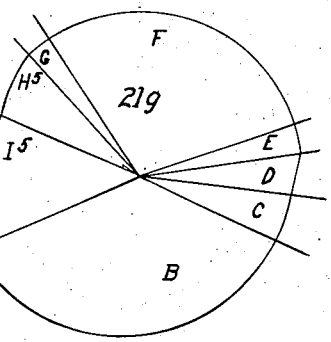
Figure 9:
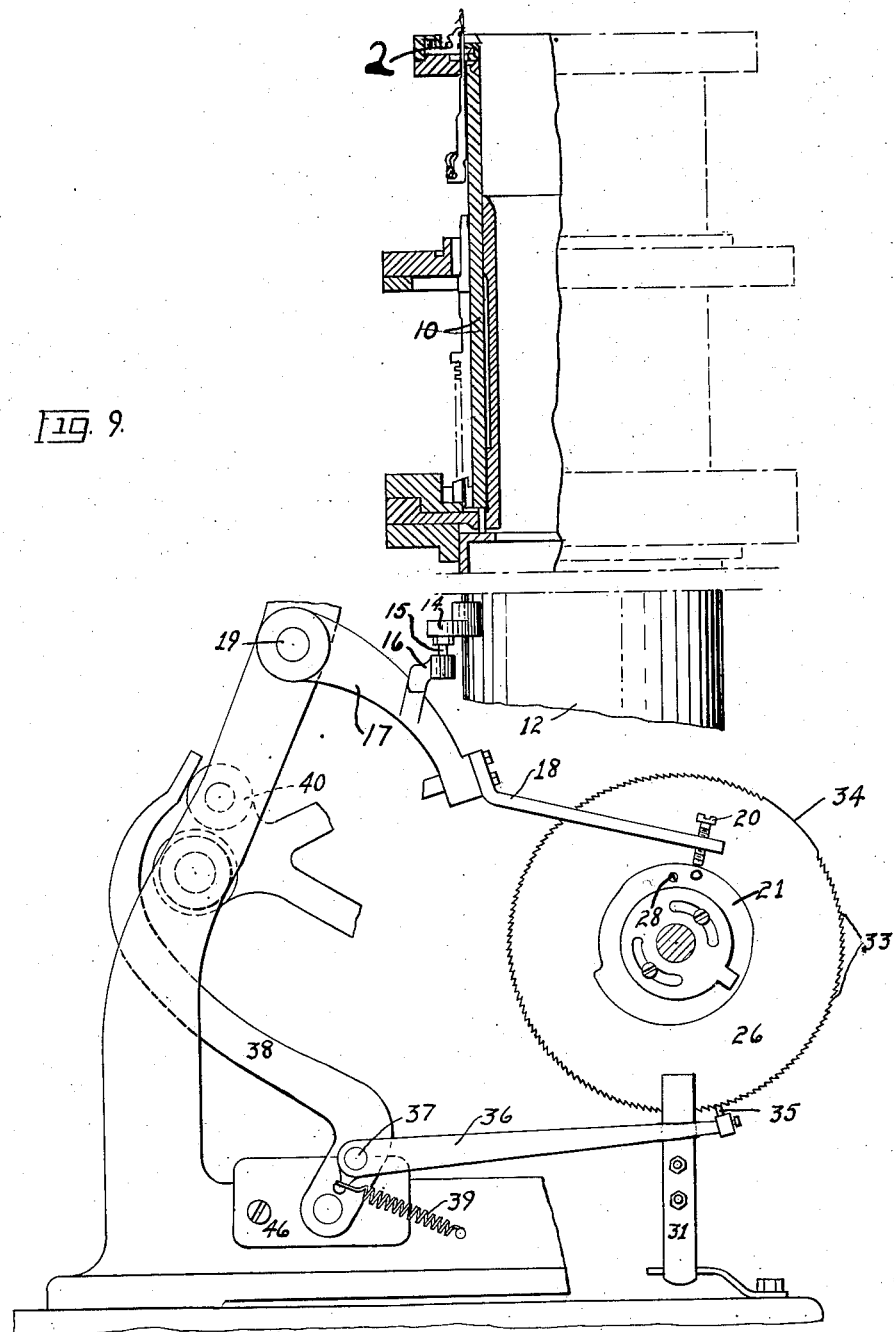

Figs. 4, 5, 6, 7, and 8 are similar views of other modifications;

Fig. 9 is a side elevation, partly in section, of a portion of a machine of the Scott & Williams type embodying the present invention in certain of its aspects;

Fig. 10 is an enlarged view of the cam arrangement;

Figs. 11-16 are views of cams modified for the production, respectively, of the stockings shown in Figs. 2-8;

Fig. 17 is a view similar to Fig. 2 showing still another modified form;

Fig. 18 is a view similar to Fig. 10 showing a cam adapted for use in the production of the hose of Fig. 17; and Fig. 19 is a schematic view of a portion of the control chain for the machine of Fig. 9.

Figure 1:
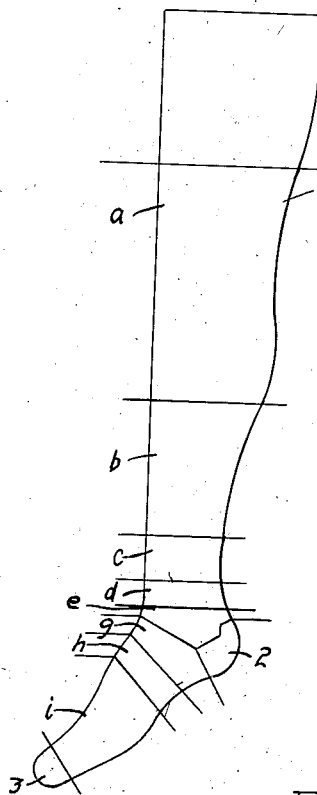
Figure 1 is a side view of one form of stocking embodying the invention and shown on a sculptured hosiery form.

In Fig. 1 there is illustrated a seamless stocking 1 having a standard modern type of heel pocket 2, a toe 3, and portions wherein the kitting is circular and comprising in the present instance one or more upper portions such as a leg portion $a$ and a calf portion $b$, and also an ankle portion $c$, an increasing portion $d$, uniform portions $e$ and $g$, which, in the present instance, are separated by the heel portion 2 and the line shown extending therefrom and known as the "heel diagonal," decreasing portion $h$, and a foot portion $i$. The portions on either side of the heel portion and the heel diagonal (whether they constitute the long-loop part of increasing or decreasing portions, as $d$ or $h$, or uniformly long-loop portions, as $e$ or $g$) are known as "heel diagonal" portions. As will be seen, the portion $i$ (with or without the adjacent part of $h$, in the present instance) includes an arch portion; and an important feature of the invention is the provision of short loops in the arch portion.

As the stocking is knitted from top to bottom, the length of the loops is decreased where necessary in the upper portion $a$ and $b$ in the usual manner so that, tho the number of loops in a row is unvaried, the stocking will more nearly conform the smaller portions of the leg. The rows of stitching in the ankle are composed of particularly small loops. In standard practice it has been customary to knit the ankle, heel-diagonal, and arch portions of loops of the same size, and, since the requirements for each of these portions is different and since the requirements for individual portions vary from the requirements for the other portions differently in different styles of hose, a loop size which is proper for one portion is not always proper for either of the other two and is often improper for both of them. Pursuant to the invention the loops in the ankle portion $c$ can be and preferably are extraordinarily short so as to assure a smooth fit in the ankle. In any event, in accordance with the invention, the length of loops at the heel-diagonal portion is greater than the length of the loops in the ankle and arch portions. The particular part or parts of the heel-diagonal portion where the loops are longest can be varied in accordance with the needs of a particular case. It is important in certain instances, however, that the change from rows of increasing length to rows of decreasing length take place in certain ones of the particular relationships to the heel pocket line (the line which separates the portions $e$ and $g$ in the present instance) which are exemplified hereinafter. In the stocking particularly exemplified in Figs. 1 and 2 the loops gradually increase in length thruout the portion $d$, they are held to the same increased length thruout the portions $e$ and $g$, and then decrease in length thruout the portion $h$. The length of the loops in the longitudinally-central foot portion $i$ is less than the length of the loops thruout most of portion $d$ and all of the portions $e$, $g$, and $h$.

In Fig. 2 there is shown a blank 4 (consisting of parts 5 and 6 separated at the heel line) corresponding to the circularly knitted portions of Fig. 1 laid out flat to give a schematic showing of the variations in normal width of the stocking, the parts where the loops are shortest being shown narrowest and the parts where the loops are longest being shown widest.

In Fig. 3 there is shown a blank with a somewhat modified heel-diagonal portion arrangement. In this instance the gradually increasing portion $d'$ continues right up to the heel-pocket line where it meets the uniform-extent portion $g$.

Another alternative is shown in Fig. 4 where the portions $d$ and $e$ are as in Fig. 2 but wherein the modified portion $h'$ has loops of gradually decreasing lengths starting at the heel line, the portion $g$ being omitted.

In the constructions of Figs. 3 and 4, the amount of yarn to the loop in the portions on both sides of the heel diagonal is nevertheless greater than in the ankle and arch portions.

Other modifications are of course possible. In certain instances it is desirable to carry past the heel line the gradual increase or the gradual decrease in tightness of loops.

In Fig. 5 the portions $d''$ and $e''$ are made smaller, the portion $g$ is omitted and the gradually decreasing portion $h''$ comes above the heel line to accommodate certain types of foot and certain foot positions resulting from the uses of particular shoes.

In Fig. 6 the portions $e$ and $g$ are both omitted and the portion $d^3$ continued right thru the heel line to meet a portion $h^3$ in which the length of the loops decreases more rapidly than in the portion $h$.

In Fig. 7 there is shown an arrangement wherein the portions $e$ and $g$ are both omitted, and where the portion $d^4$ meets the portion $h^4$ at the heel line.

In Fig. 8 there is shown an arrangement similar to Fig. 2 except that the size of the loops in the ankle portion $c'$ corresponds to the length of the loops in the longitudinally-central foot portion $i$.

In the form of mechanism shown in Fig. 9 the invention is exemplified as embodied in a standard Scott & Williams seamless hosiery machine of the basic type disclosed in the Scott et al. Patent 1,569,632 and the patents referred to therein; and a knitting method in accordance with the invention is exemplified in connection therewith.

The exemplified form of construction comprises a fabric support which may be in the form of a sinker ring 2. The needles are carried on a needle cylinder 10 which may be mounted similarly to the needle cylinder 260 of said Scott et al. Patent 1,569,632. The cylinder is supported on a column 12 corresponding to column 280 of said patent. The column is supported by members 14, 15, 16, 17, and 18 corresponding to the members 287, $x$, 286, 281, and 2810 of said patent; the lever 17 being pivoted at 19, and the extension 18 carrying an adjustable bearing screw 20 which rides on the surface of an annular cam 21. This cam in the present instance comprises a sector B (Fig. 10) for the production of a calf portion such as shown at $b$ in Figs. 1 and 2, a sector C to control the production of the ankle portion $c$, a sector D to control the production of the increasing portion $d$, a sector E to control the production of portion $e$, a sector F which extends uniformly from the sector E so as not to affect the screw 20 during the reciprocatory knitting of the heel—the cylinder being raised to a special height during this period by special means, as well known in the art—a sector G to control the knitting of portion $g$, a sector H to control the knitting of the decreasing portion $h$, and a sector I to control the knitting of the longitudinally-central foot portion $i$.

In Figs. 11–16 there are shown cams 21a, 21b, 21c, 21d, 21e, and 21f respectively having contours for the production of the modified forms shown in Figs. 3, 4, 5, 6, 7, and 8 respectively; the sectors D', H', D'', E'', D³, H³, D⁴, and H⁴ being, as will be understood, adapted to control the production of the respective portions $d'$, $h'$, $d''$, $e''$, $d^3$, $h^3$, $d^4$, and $h^4$ in the various figures in which they respectively appear.

The length of women's stockings, even tho supposedly of the same size, will vary slightly in the feet as a condition of manufacture beyond certain practical control limitations. A more important consideration is that altho hose sizes are broken down to half sizes in manufacture, wearers' feet may be actually somewhere between a given size of stocking worn and a half size smaller; in other words, the stockings may be a one-fourth size too large for her. Then, there is the factor that not all hosiery manufacturers make their hose exactly the same length in the feet for a given size and a purchaser may buy a stocking marked the size she is accustomed to wear and find it slightly too long in the foot. In full fashioned hose this does not cause wrinkles at the heel-diagonal portion, since the body fabric hugs the entire foot so snugly that the hose fabric beyond the toe does not have much opportunity to work back toward the heel-diagonal portion.

However, in the case of seamless hosiery as heretofore knit in the foot, the tight stitches at the heel-diagonal portion will not readily adjust themselves to the requirements of the foot in motion and because of the immobility of those stitches there is a tendency to draw fabric to the heel-diagonal portion from any available place in the foot to help accommodate that part of the foot's motion that should rightly be taken care of, without wrinkling, by fabric stretch and stitch realignment. It is obvious that such fabric that is drawn to the heel-diagonal portion to help meet one special condition of motion will remain as a surplus at the heel-diagonal portion when an opposite or even normal condition of motion occurs, causing wrinkles. Using the principle of stitch slackening at the heel-diagonal portion as outlined in this invention it will be seen that a graduated slackening at the heel-diagonal portion causes relatively open stitches to exist there, and therefore the stitch at the heel-diagonal portion can accommodate the varying motions of the foot without drawing fabric from any other portion of the foot, similarly in action to full fashioned fabric. However, as a special precaution to keep the surplus fabric of a too-long stocking from working back on the heel-diagonal portion to cause a poor fit there, the invention in certain of its aspects contemplates the provision of very tight fabric at the arch portion, with a longer taper down from the heel-diagonal portion. This will discourage the fabric from crawling up on the heel-diagonal portion and hence the surplus fabric resulting from the stocking being too long will cease to be a problem.

In Fig. 17 there is shown a blank of a stocking adapted to meet such a situation. In this instance the portion $h^5$ has the same incline as in the case of the portion $h$ of Fig. 2, but continues a longer distance so that longitudinally-central foot portion $i^5$ is composed of loops which are even smaller than those of the ankle portion $c$. A cam 21g for the production of this form of hose is shown in Fig. 18 and comprises a portion H⁵ of the same pitch as the portion H but of greater extent, and a portion I⁵ of less extent and of smaller radius than the portion I.

As will be seen from Fig. 9, rack wheel 26 is fastened to the cam 21 by means including screw 28. Wheel 28 has teeth 33 which may be reduced in size in comparison with the teeth of a standard machine as, for instance, that shown in said Scott et al. Patent 1,569,632, and extending thruout a much larger distance by employment of a rack wheel 26 larger in diameter than the standard one. The row of teeth is broken to provide an idling space 34. The rack wheel 26 is driven by a pawl 35 carried on an arm 36 pivoted at 37 to a rocking arm 38 which corresponds to the arm S of the last mentioned Scott et al. patent, the arm 36 being equipped with a spring 39. The rocking arm 38 bears against a hub 40 (corresponding to the hub $t$ of the last mentioned patent) on the usual rocking quadrant and the rocking arm is mounted on a slideable plate 46

(corresponding to the plate M) which is so adjusted that the swing of the pawl 35 will be adapted to the reduced size of the teeth 33.

In carrying out the invention, as with the mechanism such as illustrated in Fig. 9, the leg portions are knitted in the usual manner, the screw 20 riding down the slope B of the cam 21 as the calf portion is knitted so as to knit rows of loops of gradually decreasing length as the ankle portion is approached. Thruout the knitting of the ankle the screw 20 rides on the low level portion C so that short uniform loops will be knitted thruout the ankle portion. As the knitting runs into the heel-diagonal portion the screw 20 rides up on the rise D so as to knit a series of rows in which the length of the loops is gradually increased to a point intermediate the length of the relatively long loops of the upper portion of the leg and the length of the relatively short loops of the ankle portion. The cam then levels off to provide a portion E wherein uniform intermediate-length loops are knitted for several rows. The reciprocatory knitting of the heel pocket takes place in the usual manner, with the height of the needle cylinder controlled by the usual heel-pocket means; and the portion F of the cam passes without effect. On the resumption of circular knitting, the flat portion G of the cam maintains the cylinder stationary thruout the knitting of several rows in which the loops are of the same uniform intermediate length as those controlled by the portion E, after which the cam falls off at H to decrease the length of the loops to the desired length for the arch portion, after which there occurs a knitting at the arch portion of uniform loops which are relatively short, tho they may be and desirably are somewhat longer than the loops of the ankle portion. Modifications in operation and procedure where the cams of Figs 11–16 and 18 are used will be obvious.

Fig. 19 shows a group of chain links as commonly used in the knitting of the stocking from the start of the calf thru the foot. Certain links occur in multiples, as desired. Link 101 starts the stitch graduating. Link 102 is present in whatever number needed for knitting of portions such as b, c, d, and e. Links 103 thru 115 control the heel pocket knitting. Link 116 is present in whatever number needed for knitting of portions such as g, h, and i.

As will be apparent, links in the chain, from the time the stitch graduating mechanism is started by link 101 until the graduating movement ceases when pawl 35 reaches the clear space 34 on rack wheel 26 and the knitting of the arch portion ends should be inserted in the proper quantities of the respective types at the correct spots in the chain to correspond with the shape of cam 21 which in turn must conform with the way the stitch is to be slackened, tightened or maintained. The fixed ratio of movement of rack wheel 26 and hence cam 21 to the knitting of the stocking is one rack wheel tooth to every four courses of body fabric desired and one tooth to every two courses of heel fabric desired. The chain, other than in the heel links, knits 12 courses or rows of stitches to each link. In the heel but 6 courses or rows are knit to each link. The length of time, measured in courses, that screw 20 rides in any arcuate segment of cam 21, controlling the stitch tightness of a given portion of a stocking, must be matched in terms of chain links intended to control that particular period of knitting.

Since certain changes may be made in carrying out the above process and in the product, and modifications effected in the apparatus for practicing the principle involved, without departing from the scope of the invention, it is intended that all matter contained in the above description or shown in the accompanying drawing shall be interpreted as illustrative and not in a limiting sense.

I claim:

1. A knitted article of hosiery wherein the amount of a yarn knit to the loop in the loops in courses adjacent to the heel diagonal at both sides thereof is greater than in the courses at the ankle and at the arch.

2. A knitted article of hosiery wherein the amount of a yarn knit to the loop in the loops in courses adjacent to the deel-diagonal at both sides thereof is greater than in the courses at the ankle and at the arch, each row of the ankle, heel-diagonal and arch portions containing substantially the same number of loops.

3. A knitted article of hosiery wherein the amount of a yarn knit to the loop in the loops in courses adjacent to the heel-diagonal at both sides thereof is greater than in the courses at the ankle and at the arch, each row of the ankle, heel-diagonal and arch portions containing substantially the same number of loops, and a heel pocket being inserted in said heel-diagonal portion.

4. A knitted article of hosiery wherein the amount of a yarn knit to the loop in the loops in courses adjacent to the heel-diagonal at both sides thereof is greater than in the courses at the ankle and at the arch, and wherein the amount of yarn knit to the loop in courses of an upper portion is still greater.

5. A knitted article of hosiery wherein the amount of a yarn knit to the loop in the loops in courses adjacent to the heel-diagonal at both sides thereof is greater than in the courses at the ankle and at the arch, a larger proportion of the first-mentioned courses being above the heel-diagonal than below the heel-diagonal.

6. A knitted article of hosiery wherein the amount of a yarn knit to the loop in the loops in courses adjacent to the heel-diagonal at both sides thereof is greater than in the courses at the ankle and at the arch, a larger proportion of the first-mentioned course being below the heel-diagonal than above the heel-diagonal.

7. A knitted article of hosiery wherein the amount of a yarn knit to the loop in the loops in courses adjacent to the heel-diagonal at both sides thereof is greater than in the courses at the ankle and at the arch, the amount of yarn knit to a loop varying from course to course in a portion connecting the heel-diagonal portion with at least one of the ankle and arch portions.

8. A knitted article of hosiery wherein the amount of a yarn knit to the loop in the loops in courses adjacent to the heel-diagonal at both sides thereof is greater than in the courses at the ankle and at the arch, the amount of yarn knit to the loop varying in portions disposed at either side of the heel-diagonal portion and becoming greatest near the heel-diagonal.

9. A knitted article of hosiery wherein the amount of a yarn knit to the loop in the loops in courses adjacent to the heel-diagonal at both sides thereof is greater than in the courses at the ankle and at the arch, the amount of yarn knit to the loop varying in portions disposed at either side of the heel-diagonal portion and becoming greatest above the heel-diagonal.

10. A knitted article of hosiery wherein the amount of a yarn knit to the loop in the loops in courses adjacent to the heel-diagonal at both sides thereof is greater than in the courses at the ankle and at the arch, the amount of yarn knit to the loop varying in portions disposed at either side of the heel-diagonal portion and becoming greatest below the heel-diagonal.

11. A knitted article of hosiery wherein the amount of a yarn knit to the loop in the loops in courses adjacent to the heel-diagonal at both sides thereof is greater than in the courses at the ankle and at the arch, the size of the loops varying gradually from course to course thruout parts of the article.

12. A knitted article of hosiery wherein the amount of a yarn knit to the loop in the loops in courses adjacent to the heel-diagonal at both sides thereof is greater than in the courses at the ankle and at the arch, and at least a part of the ankle portion being composed of courses wherein the amount of yarn knit to the loop is less than the amount of yarn knit to the loop in the arch portion.

13. The method of knitting hose which comprises knitting a leg portion the loops of which gradually decrease in length as an ankle portion is approached, knitting an ankle portion of relatively short loops, knitting a connecting portion of loops of gradually increasing length, knitting a portion adjacent to the heel-diagonal of loops of a length intermediate the length of the longest loops in the leg portion and the shortest loops in the ankle portion, knitting a connecting portion with loops of gradually decreasing length, and knitting an arch portion of relatively short loops.

14. The method of knitting hose which comprises knitting a series of rows having relatively long loops, knitting a series of rows in which the length of the loops is gradually decreased, knitting a series of rows having relatively short loops, knitting a series of rows in which the length of the loops is gradually increased to a point intermediate the lengths of said relatively long loops and said relatively short loops, knitting a heel pocket after rows of intermediate-length loops have been knit, knitting a series of rows of intermediate-length loops in which the length of the loops gradually decreases, and knitting an arch portion of relatively short loops.

15. The method of knitting hose which comprises knitting a series of rows having relatively long loops, knitting a series of rows in which the length of the loops is gradually decreased, knitting a series of rows having relatively short loops, knitting a series of rows in which the length of the loops is gradually increased to a point intermediate the lengths of said relatively long loops and said relatively short loops, knitting a heel pocket after rows of intermediate-length loops have been knit, knitting a series of rows of intermediate-length loops in which the length of the loops gradually decreases, and knitting an arch portion of relatively short loops but longer than the aforesaid relatively short loops.

LAWRENCE W. GOTTSCHALCK.

REFERENCES CITED

The following references are of record in the file of this patent:

UNITED STATES PATENTS

| Number | Name | Date |
|---|---|---|
| 129,146 | Landenberger | July 16, 1872 |
| 200,225 | Shaw | Feb. 12, 1878 |
| 1,233,714 | Scott | July 17, 1917 |
| 1,569,632 | Scott et al. | Jan. 12, 1926 |
| 2,157,116 | Carothers | May 9, 1939 |
| 2,200,207 | Page et al. | May 7, 1940 |
| 2,357,630 | Cole | Sept. 5, 1944 |